(12) United States Patent
Sychov (10) Patent No.: US 10,227,016 B2
(45) Date of Patent: Mar. 12, 2019

(54) CEILING MOUNTED CHARGING STATION AND PARKING STRUCTURE FOR CHARGING ELECTRIC VEHICLES

(71) Applicant: EASYCHARGE.me GmbH, Dusseldorf (DE)

(72) Inventor: Artur Sychov, Dusseldorf (DE)

(73) Assignee: EASYCHARGE.ME GMBH, Dusseldorf (DE)

( * ) Notice: Subject to any disclaimer, the term of this patent is extended or adjusted under 35 U.S.C. 154(b) by 0 days.

(21) Appl. No.: 15/321,513

(22) PCT Filed: Jun. 26, 2015

(86) PCT No.: PCT/EP2015/064539
§ 371 (c)(1),
(2) Date: Dec. 22, 2016

(87) PCT Pub. No.: WO2015/197826
PCT Pub. Date: Dec. 30, 2015

(65) Prior Publication Data
US 2017/0158072 A1 Jun. 8, 2017

(30) Foreign Application Priority Data
Jun. 27, 2014 (EP) .................................... 14174700

(51) Int. Cl.
*H02J 7/00* (2006.01)
*H02J 7/14* (2006.01)
*B60L 11/18* (2006.01)

(52) U.S. Cl.
CPC ....... *B60L 11/1824* (2013.01); *B60L 11/1816* (2013.01); *B60L 11/1833* (2013.01);
(Continued)

(58) Field of Classification Search
CPC .................................................. B60L 11/1824
(Continued)

(56) References Cited

U.S. PATENT DOCUMENTS

| 2010/0102775 A1* | 4/2010 | Chander | B60L 11/1816 320/109 |
|---|---|---|---|
| 2012/0229085 A1* | 9/2012 | Lau | B60L 11/1818 320/109 |
| 2013/0076902 A1* | 3/2013 | Gao | B25J 9/042 348/148 |

* cited by examiner

*Primary Examiner* — Edward Tso
*Assistant Examiner* — Ahmed Omar
(74) *Attorney, Agent, or Firm* — Casimir Jones, S.C.; Mary Ann D. Brow (57) ABSTRACT

The present invention relates to a ceiling mounted charging station for charging the battery of an electric vehicle (210) parking on a parking space (200). The charging station comprises a charging arm (120) for connection with the electric vehicle (210). The first end of the charging arm (120) is mounted to a housing (140) of the charging station. A charging interface (180) for connection with a corresponding charging socket (220) of the electric vehicle (210) is located at a second end of the charging arm (120) opposite to the first end. The charging arm (120) is rotatable with respect to the housing (140) between a stored-position and a use-position. The distance of the second end of the charging arm (120) to the ground (250) of the parking space (200) is smaller in the use-position as in the store-position. The invention furthermore relates to a parking structure comprising a multiplicity of parking spaces (15) for vehicles and at least one charging station (22, 23) mounted to the ceiling of the parking structure. The inventive charging station and the inventive parking structure provide the possibility of an easy charging of electric vehicles, wherein installation costs are low.

17 Claims, 8 Drawing Sheets

(52) U.S. Cl.
CPC ........ *B60L 2230/10* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
USPC .................................................. 320/104, 109
See application file for complete search history.

CEILING MOUNTED CHARGING STATION AND PARKING STRUCTURE FOR CHARGING ELECTRIC VEHICLES

The present application is a § 371 US National Entry of International Application No. PCT/EP2015/064539, filed Jun. 26, 2015, which claims the benefit of European Patent Application No. 14174700.6, filed Jun. 27, 2014.

The present invention relates to a ceiling mounted charging station for charging the battery of an electric vehicle. The invention furthermore relates to a parking structure comprising a multiplicity of parking spaces for vehicles and at least one charging station mounted to the ceiling of the parking structure.

Due to the shortening of conventional oil reserves and an according rise in fuel prices, the automobile industry more and more shifts its focus from combustion engines towards electrical engines. On the way to a large-scale use of electrical vehicles, however, a major problem remains that the range of such vehicles is limited by a limited battery capacity. Accordingly, a wide network of charging stations is required to allow an easy and comfortable recharge of vehicle batteries at places where the electric vehicles are parked.

It is known to mount a battery charging station at the ceiling of a sheltered parking space. However, known ceiling mounted charging stations often require a costly and complex installation or they are difficult to handle for the user. For instance, it is known to use long cables arranged in a complex retracting mechanism being costly and requiring high maintenance efforts.

In view of this, it is the object of the present invention to provide a parking structure and a ceiling mounted charging station which avoid the disadvantages of the state of the art at least partially.

The object is solved by the features of independent claims 1 and 10. Preferable embodiments are to be found in the dependent claims.

According to the invention it is provided a ceiling mounted charging station for charging the battery of an electric vehicle parking on a parking space. The charging station comprises a charging arm for connection with the electric vehicle. The first end of the charging arm is mounted to a housing of the charging station. A charging interface for connection with a corresponding charging socket of the electric vehicle is located at a second end of the charging arm opposite to the first end. The charging arm is rotatable with respect to the housing between a stored-position and a use-position. The distance of the second end of the charging arm to the ground of the parking space is smaller in the use-position as in the store-position.

First of all, a few terms used within the present invention are explained. The term charging interface has to be understood in a broad meaning. The term charging interface may comprise a connector which can be directly inserted into a corresponding charging socket of a vehicle. The term also covers any interface which requires further connection means to establish a connection with the charging socket of the vehicle, for instance further cables. The charging interface may comprise one or more of the following: a schuko socket, a type 1 or type 2 vehicle connector socket according to International Electrotechnical Commission standard IEC 62196, a suitable extension cable for the above mentioned sockets, an optional charge controller, a (smart) meter, circuit breakers and/or fuses. The charging interface may offer interaction with the vehicle and/or the user to authorize and control the charging of the vehicle and may also be able to interact with a backend system to e.g. control the charging dependent on the actual loading of a grid. The electronics for said functionality may be situated partly or entirely in the charging interface or may also at least partially or entirely be situated in the housing of the charging station.

A ceiling within the invention comprises any kind of covering, caping, or roofing structure arranged above a parking space for a vehicle. The term ceiling does not impose any limitations in terms of material, surface condition, or orientation of the ceiling. The inventive charging station may be used in any kind of parking space which provides such a ceiling, for instance a parking space in a garage or in a multistory parking structure.

The distance between the ground of the parking space and the second end of the charging arm means the distance in a vertical direction from the ground to the second end of the charging arm.

The inventive charging station can be mounted to the ceiling above a parking space. When the charging station is not in use, the inventive charging arm being mounted rotatable with respect to the housing remains in the stored-position. In this position the charging arm does not disturb the user, as the distance between the ground and the second end of the charging arm is large. Therefore the user can easily perform any maneuvering or parking operations, get in our get out of the vehicle, or load or unload the vehicle without being disturbed by the charging arm or any charging equipment attached to the charging arm. After the vehicle is parked on the parking space below the charging station the inventive charging arm may be moved into the use-position by rotating the charging arm with respect to the housing. As the distance between the ground and the charging interface located at the second end of the charging arm is smaller in the use-position, the user may easily connect the charging interface to a corresponding charging socket of the electric vehicle without handling long cables.

According to the invention, the charging arm is rotatable between the stored-position and the use-position around an axis being essentially parallel to a horizontal axis. By rotation about an essentially horizontal axis the distance between the ground and the charging interface can be effectively adjusted.

Electric vehicles of various types usually differ in their dimensions and also in the position of the charging socket at the car body. A charging station, however has to be adjustable such that every kind of vehicle can be charged by the charging station. According to the invention, the charging arm therefore comprises a first segment at which the charging arm is mounted to the housing and a second segment at which the charging interface is located, the first segment and the second segment enclosing an angle between 45° and 135° between each other. Preferably, the enclosed angle is essentially rectangular. According to the invention, the first segment is arranged essentially parallel to a horizontal axis. By using two segments enclosing an angle with each other, the span length of the charging arm (which is the distance of two vertical axes, the first of which intersects the mounting point of the charging arm and the second of which intersects the charging interface) is increased. In particular, the length of the first segment can be chosen appropriately to achieve a use-position, in which the charging interface is positioned close to the corresponding charging socket of the vehicle. It is preferred that the angle between the first and the second segment is essentially rectangular.

It is furthermore preferred that the charging arm is rotatable with respect to the housing about a second axis. Preferably the second axis encloses an angle between 70° and 110° with the first axis, more preferably an angle of essentially 90°. The second axis may be oriented essentially vertical. This configuration provides a very good adjustability of the charging arm and allows the adaption of the charging arm to vehicles of different kind. By rotating the charging arm around the second axis, the charging interface moves circularly around the second axis. Within this circle, the charging interface can be rotated to the position which is closest to the corresponding charging socket to allow an easy connection. The charging arm may be rotatable by 360° around the second axis. However, in many cases it may be sufficient if the charging arm is rotatable by less than 360°, for instance by 180°. In particular, a rotation by 180° may be sufficient to move the charging interface to the left side or to the right side of a vehicle being parked beneath the charging station, so that vehicles having their charging sockets at different sides can be charged easily.

In the stored-position, the charging arm may be located too high to be reached by a user with his hands. In a preferred embodiment a pulling means is therefore attached to the charging arm. The pulling means may be a rope or a ribbon attached to the second end of the charging arm dangling from the charging arm down to a height which is within the reach of the user. The pulling means may be grasped by a user in order to pull the charging arm from the stored-position into the use-position.

In case an extension cable is used to establish a connection between the charging interface and the corresponding charging socket, the extension cable may be longer than needed. In an advantageous embodiment, the charging interface therefore comprises a hooking element for a connection cable.

In a preferred embodiment, the charging station comprises a lamp for illumination of the parking space. The lamp may be embodied by all kind of lighting means such as fluorescent lamps or tubes, electric bulbs, halogen lamps, or LED lamps. The provision of a lamp at the charging station is beneficial, as it allows the replacement of lamps which have already been present at the parking space. It is, thus, not necessary to install both charging stations and lamps. The installation costs are therefore reduced. Furthermore, the power cables which are usually already present at parking spaces may be used for the power supply of the inventive charging station. No further cabling needs to be installed.

In a preferred embodiment, the first segment of the charging arm comprises a support mechanism being adapted to support the movement of the charging arm from the use-position into the store-position. Preferably, the first segment of the charging arm furthermore comprises an interlock mechanism being adapted to lock the charging arm in the use-position. The support mechanism and the interlock mechanism may be combined in a support and interlock mechanism. Such mechanisms simplify the manual use of the charging station, as during the charging process the charging arm may be locked in the use-position. Subsequent to a charging process the mechanism supports the movement of the charging arm back into the store-position.

Preferably the first segment comprises an outer carrier element being attached to the housing and an inner carrier element being attached to the second segment, wherein a rotation of the charging arm between the use-position and the store-position is achieved by a rotation of the inner carrier element with respect to the outer carrier element. Preferably, the support and/or interlock mechanism is adapted to support a rotation of the inner carrier element with respect to the outer carrier element and/or to lock the inner carrier element with respect to the outer carrier element in a position corresponding to the use-position of the charging arm. Thus, by rotating the inner carrier element (being attached to the second segment) with respect to the outer carrier element (being attached to the housing) the charging arm may be moved from the store-position into the use-position and vice versa, while being supported and/or locked by the support and/or interlock mechanism.

The support and/or interlock mechanism preferably comprises a spring biased bearing being attached to the inner carrier element and having an inclined surface, and a counter bearing being attached to the outer carrier element, wherein the counter bearing comprises roof-like surfaces being adapted to cooperate with the inclined surface of the spring biased bearing during a rotation of the inner carrier element with respect to the outer carrier element. Preferably, the inclined surface is pressed against the roof-like surface by means of the spring. Thus, a robust and easily realizable mechanism is provided to support the movement of the charging arm. The spring biased bearing preferably comprises a recess for receiving a projection of the counter bearing. This allows to lock the inner carrier element with respect to the outer carrier element by engagement of the projection in the recess.

In an alternative embodiment, the charging station comprises an automatic drive mechanism being adapted to move the charging arm. Preferably the automatic drive mechanism is adapted to rotate the second segment around the axis of the first segment. In addition or alternatively, the automatic drive mechanism may be adapted to move the second segment along the axis of the first segment. The use of an automatic drive mechanism increases the user-friendliness, as no manual movement of the charging arm is necessary. Furthermore, the automatic movement of the charging arm provides the possibility to automatically connect the charging interface of the charging station with a corresponding charging socket of an electric vehicle.

Preferably, the automatic drive mechanism comprises an electric engine being adapted to drive a transmission element having an inner thread, wherein the inner thread is in engagement with an outer thread of a spindle, wherein the spindle is arranged essentially along the axis of the first segment, and wherein the spindle is attached to the second segment. This configuration allows to convert the rotational movement of the electric engine into a linear movement of the spindle along the axis of the spindle. As the second segment is fixed to the spindle, the second segment is likewise moved linearly along the axis of the spindle.

In a preferred embodiment, the automatic drive mechanism comprises a detachable connection between the transmission element and the second segment, wherein the second segment is rotated around the axis of the first segment when attached to the transmission element. If the second segment is attached to the transmission element, it may be rotated from the store-position to the use-position. Afterwards, the second segment may be detached from the transmission element in order to be moved linearly along the axis of the first segment.

The process of manually connecting the charging interface of the charging station with the charging socket of the electric vehicle may be cumbersome, as it has to be repeated for a great number of times during the lifetime of the electric vehicle. In a preferred embodiment the charging station therefore comprises a sensor for detecting positional data of the charging socket of an electric vehicle being parked on the parking space, a processing unit being adapted to convert the positional data of the charging socket into corresponding movement data of the charging arm, wherein the automatic drive mechanism is adapted to receive the movement data from the processing unit and to move the charging arm according to the movement data. These features allow an automatic connection of the charging interface with the charging socket. If the vehicle is parked within the range of the charging arm, the charging interface may be automatically moved to a position at which a connection is established.

The invention is also directed to a system comprising a charging station as described in relation with the present invention and a self-driving electric vehicle, wherein the electric vehicle is adapted to automatically drive to a position on the parking space, wherein the position is exactly defined with respect to the charging station. Preferably, the charging interface of the charging station is insertable into the charging socket of the electric vehicle by an automatic movement of the charging arm, if the electric vehicle is located at the exactly defined position.

It is furthermore preferred that the charging station comprises a sending unit for sending positional data corresponding to the exactly defined position, wherein the self-driving electric vehicle comprises a receiving unit for receiving the positional data, wherein the electric vehicle is adapted to convert the positional data to a corresponding movement of the electric vehicle, wherein the movement is adapted to move the electric vehicle to the exactly defined position. The sending unit and the receiving unit may be adapted to use a wireless data connection such as wifi, bluetooth or GSM. The inventive features therefore provide the possibility to automatically connect the charging interface of the charging station with the charging socket of the electric vehicle.

The invention furthermore provides a parking structure, in which the inventive charging station can be used.

According to the invention, the parking structure comprises a multiplicity of parking spaces for vehicles and an electric power distribution system. The electric power distribution system comprises a connection point at which electric energy provided by an energy provider arrives at the parking structure, and at least one lamp supply cable configured to supply electric power from the connection point to a multiplicity of lamp positions. The parking structure furthermore comprises at least one battery charging station for charging the battery of an electric vehicle. The battery charging station is supplied with energy by a connection to the lamp supply cable.

The term parking structure covers all types of roofed or covered parking spaces, such as underground car parks, garages, roofed or covered car parking lots, or multistory car parks. A parking structure usually comprises at least one vehicle access for entering and/or leaving the parking structure and at least one access path accessible by vehicle, wherein the access path connects the at least one vehicle access with the multiplicity of parking spaces.

A lamp position according to the invention is a position at the ceiling, at the wall, or at the ground of the parking structure at which a lamp may be arranged. It is not necessary that a lamp is actually arranged at a lamp position.

The multiplicity of lamp positions is configured such that a sufficient illumination of the parking structure can be achieved by mounting appropriately chosen lamps at the lamp positions. 'Sufficient illumination' means that the illumination is bright enough for a safe use of the parking structure. For instance, a 'sufficient illumination' implies that pedestrians or building structures such as walls are clearly visible. Lamp positions may depend on building design factors of the parking structure, on the reflectivity of the ground and/or the ceiling and/or the walls of the parking structure, on the light intensity of the lamps used in the parking structure or on external sources of light such as direct or indirect sunlight falling into the parking structure. For instance, if a lamp has a high light intensity, adjacent lamp positions may be chosen further apart from each other.

The inventive parking structure allows the use of charging stations in a parking structure without the need of complex and costly installations. In particular, it is not necessary to install a separate electric power distribution system for the charging stations, as the electric power distribution system which supplies energy to lamp positions via lamp supply cables is used to supply electric energy to the charging stations at the same time. Therefore, during construction of an inventive parking structure the design of the electric power distribution system is less complex. Furthermore, in existing parking structures the invention provides a very easy and cost-effective way of retrofitting the parking structure with charging stations. In particular, an already existing electric power distribution system comprising lamp supply cables can be used to supply electric energy to the retrofitted charging stations.

In a preferred embodiment, the electric power distribution system comprises a switch installed at a lamp supply cable between the connection point and a lamp position, wherein the switch is configured to switch on or off the supply of electric power to a multiplicity of lamp positions. The switching states of the switch are in the following called 'on-state' and 'off-state'. The switching may be conducted by switching on and off the voltage supply. Such a switch may be used to switch off the power supply to the multiplicity of lamp positions in case no power is required at the lamp positions. The switch may be manually operated. For instance, in case no electric power is required, an operator may switch off the power supply. The switch may also be time-controlled. For instance, the switch may be configured to switch off the power supply during night. The switch may, furthermore, be controlled by a motion detector, detecting the motion of persons or vehicles within the parking structure. The switch may be configured to switch off the power supply, in case no movement of vehicles or persons is detected for a certain time span inside of the parking structure.

However, in case a battery of a vehicle is charged by a charging station which is connected to a lamp supply cable, it may be undesirable that the power supply is switched off. In a preferred embodiment, the parking structure therefore comprises a bypass installed at a lamp supply cable between the connection point and a lamp position parallel to the switch. Power may in this case be supplied to the lamp positions via the bypass, irrespective of the switching state of the switch. The provision of such a bypass allows to circumvent the switch, in case a battery is charged by a charging station. The battery of a vehicle may therefore be charged, even in cases in which the switch is set to the off-state, for instance at night or in cases where no motion has been detected by a motion detector for a certain period of time.

The bypass may be operated manually by a user. The user may activate the bypass after a connection between a battery and a charging station has been established. In a preferred embodiment, however, the parking structure comprises a sensor for detecting a connection between a charging station and a battery of an electric vehicle, wherein the sensor is adapted to send a signal relating to the connection status. Preferably, the bypass is controlled by the signal from the sensor. The term connection status may comprise information on whether or not a connection is established between the charging station and a corresponding charging socket of an electric vehicle, and/or on whether the battery is already charged completely or if it needs further charging. In a preferred embodiment, the sensor sends a first signal, in case a connection between the charging station and a battery is established. Preferably, upon receipt of the first signal the bypass bypasses the switch such that electric power is supplied to the charging station. Furthermore, it is preferred that the sensor sends a second signal, in case the connection between the battery and the charging station is disconnected or in case the battery is recharged to a desired level. Upon receipt of the second signal, the bypass preferably discontinues to bypass the switch.

In an alternative embodiment, the switch is controlled by the signal received from the sensor. In particular, the signal received from the sensor may turn the switch between a charging mode and a non-charging mode. Preferably, upon receipt of the first signal, the switch is turned into the charging mode, and upon receipt of the second signal into the non-charging mode. In the charging mode the switch is preferably adapted to carry out the function of the above mentioned bypass without the need to actually install a physical bypass in parallel to the switch. Advantageously, in the charging mode electric power is supplied to the lamp positions, wherein the manual control and/or the time-control and/or the motion-control of the switch is deactivated. Preferably, in the non-charging mode the manual control and/or the time-control and/or the motion-control of the switch is reactivated.

In a preferred embodiment, the sensor detects a current flow in at least one lamp supply cable. By detection of the current flow in at least one lamp supply cable it is possible for the sensor to detect if a battery of an electric vehicle is charged by a charging station. In this case the inventive sensor makes use of the fact that the power consumption of a lamp usually is considerably lower than the power consumption of a charging station during the charging progress. Accordingly, the current flow is considerably larger in case a battery is charged by a charging station. The use of a sensor detecting the current flow in a lamp supply cable is advantageous, as it is not required to install a dedicated sensor at each charging station. Instead, a single sensor can be used to monitor the connection status of a multiplicity of charging stations. The installations costs are therefore reduced considerably.

In a further preferred embodiment the parking structure comprises a user terminal, wherein the switch and/or the bypass is controlled by the user terminal. The user may, for instance, enter a desired time span for the charging process or a desired amount of energy to be fed to the battery. The user terminal may be located remote from the charging station, for instance at a central point of the parking structure or in the vicinity of a wiring cabinet of the electric power distribution system.

In a preferred embodiment, the battery charging station is mounted to the ceiling of the parking structure at a position located essentially above a parking place. This facilitates the connection between the charging station and an electric vehicle parked beneath the charging station.

The charging station may comprise a residual current protective device and/or an overcurrent protection and/or a circuit breaker. In case of any malfunction, these measures guarantee the safety of the user.

It is preferred that the charging station comprises a lamp illuminating a space within the parking structure, wherein the lamp emits a luminous flux of more than 200 lumen, preferably more than 400 lumen, more preferably more than 1000 lumen. The lamp may be embodied by all kind of lighting means such as fluorescent lamps or tubes, electric bulbs, halogen lamps, or LED lamps. Such a luminous flux is appropriate for providing a sufficient illumination. A usual lamp may be replaced by a charging station comprising a lamp. This is particularly beneficial, if a lamp to be replaced is located essentially above a parking space. The installation of charging stations is thereby further simplified. In particular, one and the same lamp supply cable is used to supply energy to the charging station and the lamp comprised therein. In contrast to this, a usual charging station without a lamp would require the installation of an additional lamp, thus increasing the installation costs.

The features, objects and advantages of the invention will become further apparent by the following exemplary description of preferred embodiments in conjunction with the accompanying drawings, which show.

Figure 1:
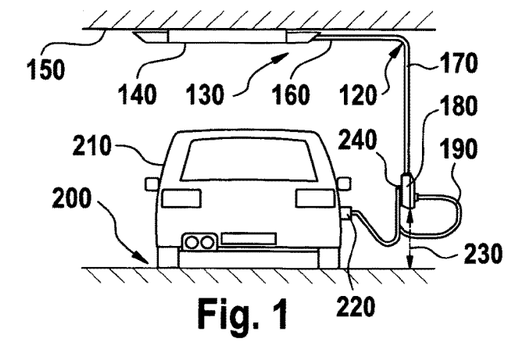
FIG. 1: a back view of a first embodiment of an inventive charging station in the use-position.

FIG. 1 shows a back view of an inventive charging station 130 mounted at a ceiling 150 above a parking space 200 on which an electric vehicle 210 is parked. The charging station 130 comprises a housing 140 to which a charging arm 120 is attached. Inside of the housing an LED lamp is arranged which is not visible in FIG. 1. The LED lamp serves to illuminate the parking space. The charging arm 120 comprises a first segment 160 and a second segment 170, the segments enclosing and angel of 90° between each other. The first segment 160 is arranged essentially in parallel to the horizontal plane of the ceiling 150. The second segment 170 is arranged essentially vertical. The charging arm 120 is mounted at a mounting point which is not shown in FIG. 1 inside of the housing 140. A charging interface 180 is arranged at the second segment 170 at the end of the charging arm 120.

In FIG. 1, the charging arm 120 is in a use-position. In this position, a connection between the charging interface and the electric vehicle 210 can be easily established by using a cable 190. The cable 190 is plugged into the charging interface 180 and into the corresponding charging socket 220 of the vehicle 210. In the use-position of the charging arm 120, the distance 230 between the charging interface 180 and the ground of the parking space 200 is small such that the charging interface 180 and the charging socket 220 are essentially on the same height. Therefore, only a short cable is necessary to establish the connection. However, if only a long cable is at hand (such as cable 190 in FIG. 1) it can be hinged behind a hooking element 240 at the charging interface 180, as shown in FIG. 1.

Figure 2:
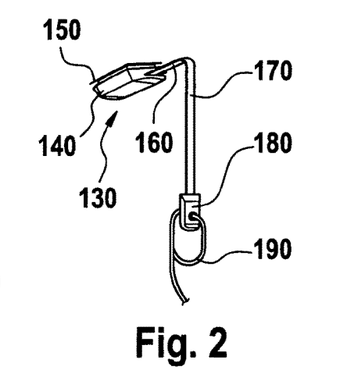
FIG. 2: a three-dimensional view of the charging station of FIG. 1.

For a better overview, FIG. 2 shows the charging station 13 of FIG. 1 in an inclined three-dimensional view. Like elements are labelled with like reference numerals. The vehicle as well as the ground is omitted.

Figure 3A:
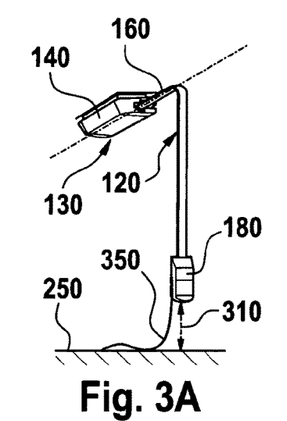
FIG. 3A: a three-dimensional view of the charging station of FIG. 1 in the use-position.
Figure 3B:
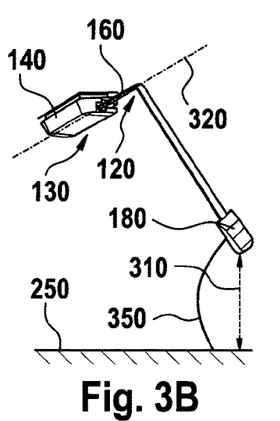
FIG. 3B: a three-dimensional view of the charging station of FIG. 1 in an intermediate position between the use-position and the store-position.
Figure 3C:
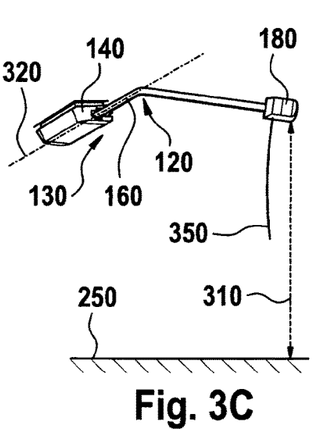
FIG. 3C: a three-dimensional view of the charging station of FIG. 1 in the store-position.

FIGS. 3A, 3B, and 3C show the charging station 130 in the same three-dimensional view of FIG. 2, wherein three different positions of the charging arm 120 are shown. In FIGS. 3A-3C the cable 190 is omitted for clarity. The charging arm 120 can be moved from the use-position shown in FIG. 3A into an intermediate position shown in FIG. 3B and into a stored-position shown in FIG. 3C by rotation of the charging arm 120 around the axis 320 indicated by the dashed line in FIGS. 3A-3C. The axis 320 is oriented along the first segment 160 of the charging arm 120 and intersects with the mounting point which is not shown in FIGS. 3A-3C. By moving the charging arm 120 from the use-position over the intermediate position into the stored-position, the distance 310 between the charging interface 180 and the ground 250 of the parking space 200 increases. In FIG. 3C the charging arm is arranged essentially in parallel to the plane of the ceiling at a short distance to the ceiling such that the charging arm 120 does not disturb the user.

The charging arm is moved from the use-position into the stored-position by a spring element (not shown in FIGS. 3A-3C) pre-biasing the charging arm 120 into the stored-position. In FIG. 3A, however, the charging arm 120 is locked in the use-position. After releasing the lock, the charging arm 120 moves into the intermediate position and subsequently into the stored-position by means of the spring force. A rope 350 is attached to the charging interface 180. A user may grasp the rope 350 in order to pull down the charging arm 120 from the stored-position into the use-position against the force of the spring element.

Figure 4A:
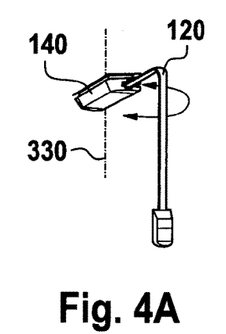
FIGS. 4A-4D: a three-dimensional view of the charging station of FIG. 1 in the use-position, wherein the charging arm is in several positions between the right side and the left side of the housing.
Figure 4B:
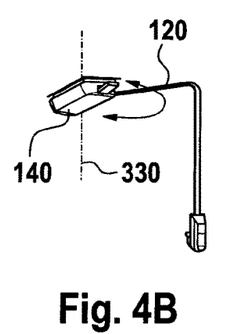
Figure 4C:
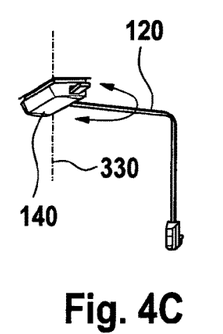
Figure 4D:
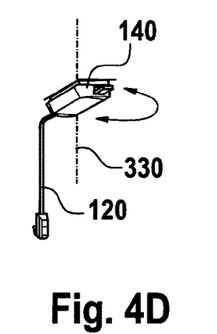

FIGS. 4A-4C show the charging station 130 in a three-dimensional view as already shown in FIG. 2 or 3A. The charging station 130 is in the use-position. In FIG. 4A the charging arm 120 is located on the right side of the housing 140. In FIGS. 4B-4D it is illustrated that the charging arm 120 can be rotated about a second axis 330 which is indicated by a dashed line in FIGS. 4A-4D. The axis 330 is vertical and intersects the mounting point (not shown in FIGS. 4A-4D) inside of the housing 140. Accordingly, by rotation of the charging arm 120 around the axis 330 the charging arm 120 can be moved from a position on the right side of the housing 140 to a position on the left side of the housing 140. Therefore, the charging arm 120 can be moved to both sides of an electric vehicle parked beneath the charging station such that both vehicles having their charging socket on the right side and vehicles having their charging socket on the left side can be easily charged with the inventive charging station.

Figure 5:
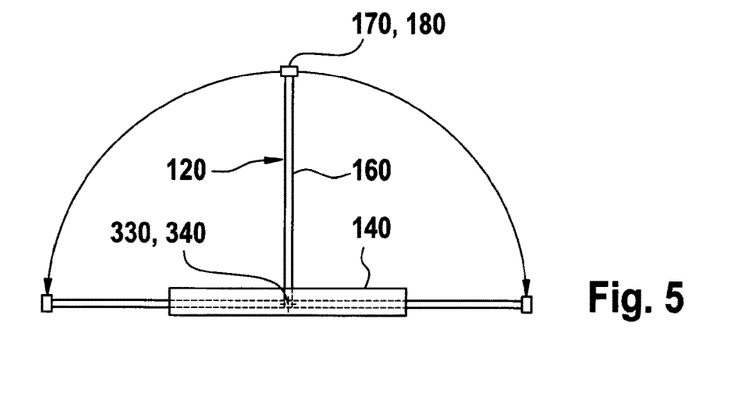
FIG. 5: a schematic view of the charging station of FIG. 1 from the top.

FIG. 5 illustrates the charging arm 120 in a schematic view from the top, wherein three positions are shown which can be achieved by a rotation around the axis 330 shown in FIGS. 4A-4D. The charging arm 120 is in the use-position. As can be seen, the charging arm 120 can be rotated from a position at the right side of the housing 140 to a position at the left side of the housing 140 or to a position at an intermediate position between the right side and the left side. In FIG. 5 the housing is illustrated transparent, such that the mounting point 340 is visible. The axis 330 shown in FIGS. 4A-4D is rectangular to the image plane of FIG. 5 and intersects the mounting point 340.

Figure 6:
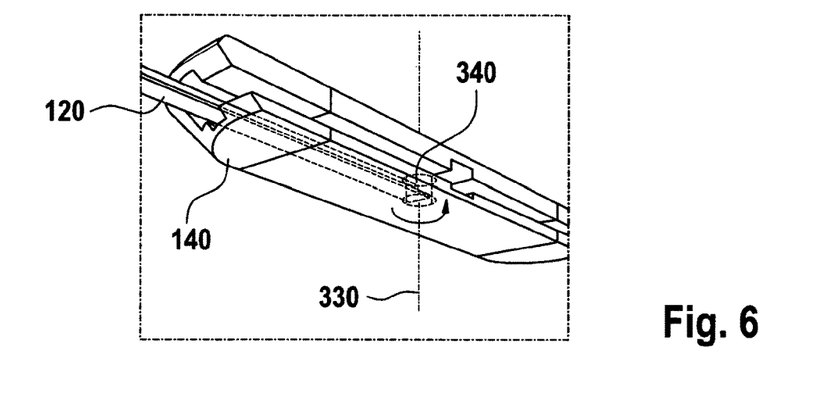
FIGS. 6-10: inclined three-dimensional views of the housing 14 of the inventive charging station, wherein the charging arm assumes different rotary positions and wherein the housing is illustrated transparent.
Figure 7:
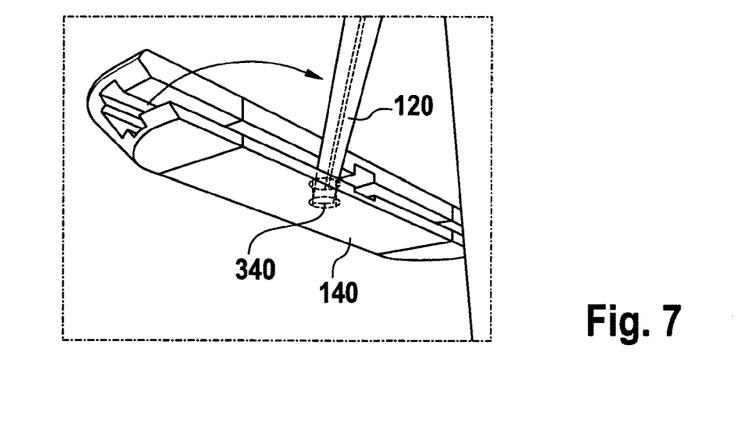
Figure 8:
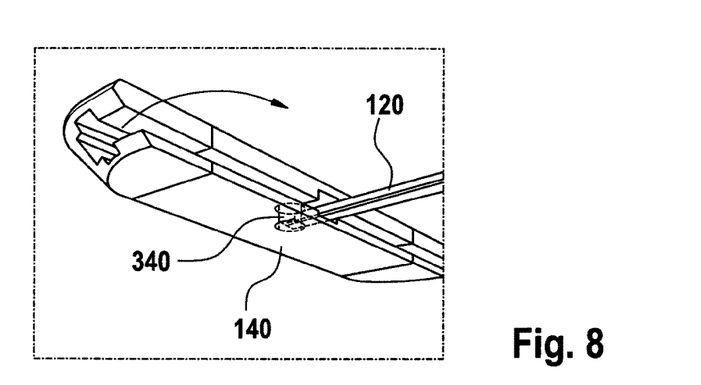
Figure 9:
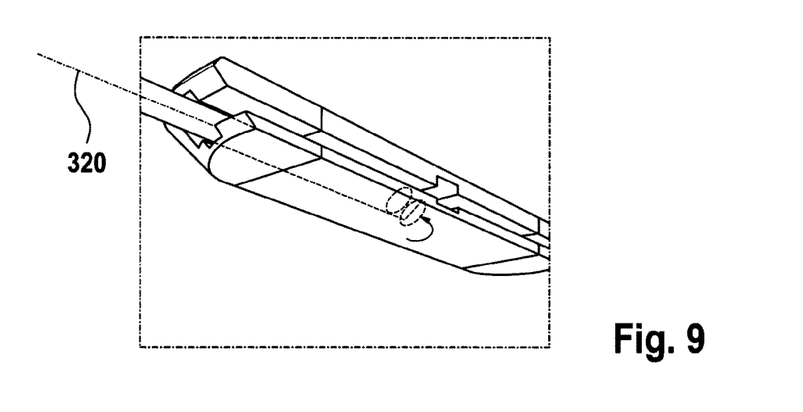
Figure 10:
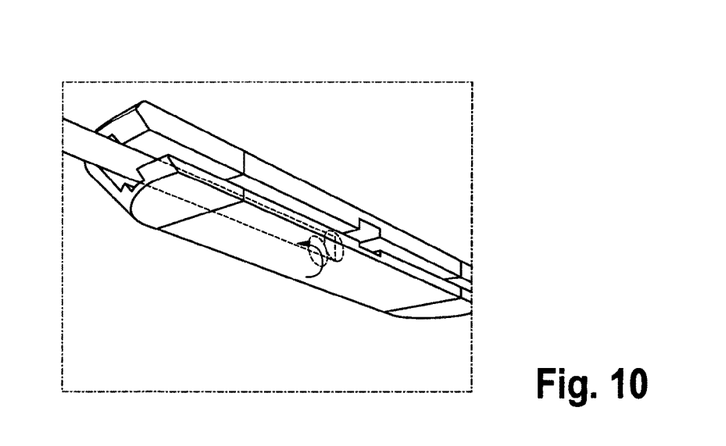

FIGS. 6-10 show inclined three-dimensional views of the housing 140 of the inventive charging station, wherein the housing 140 is presented in a transparent manner. FIGS. 6-8 illustrate the rotation of the charging arm 120 around the axis 330 from the right side (corresponding to the position shown in FIG. 4A) to a first and a second intermediate position (corresponding to the positions shown in FIGS. 4B and 4C) of the charging arm. FIGS. 6, 9 and 10 illustrate the rotation of the charging arm 120 around the axis 320 from the use-position shown in FIG. 6 to an intermediate position shown in FIG. 9 (corresponding to the position shown in FIG. 3B) to the stored-position shown in FIG. 10 (corresponding to the position shown in FIG. 3C).

Figure 10A:
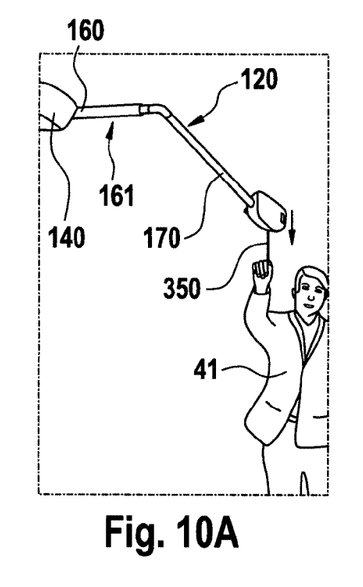
FIG. 10A: a three-dimensional view of a further embodiment of an inventive charging arm, wherein the first segment comprises a support and interlock mechanism.

FIG. 10A shows another embodiment of an inventive charging station in a three-dimensional perspective view. The first segment 160 comprises a support and interlock mechanism 161 the functionality of which is explained in the following in connection with FIGS. 10B-10M. A user 41 pulls on a rope 350 in order to move the charging arm from the store-position into the use-position. The movement of the charging arm is supported by the support and interlock mechanism 161. Furthermore, the charging arm 120 may be locked in the use-position by the support and interlock mechanism.

Figure 10B:
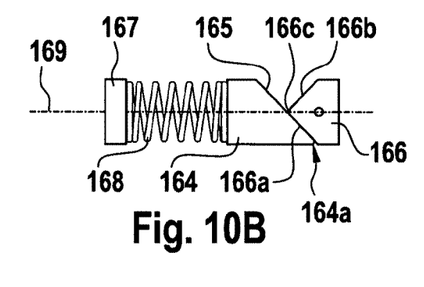
FIG. 10B: a detailed side-view of an inventive support and interlock mechanism.

In FIG. 10B a detailed side-view of the support and interlock mechanism 161 is shown, wherein several elements are left out for clarity. The mechanism 161 comprises a spring 168 which is attached to a circular base 167 on its left end. The base 167 is fixed to an inner carrier element 163 of the first segment 160 (not shown in FIG. 10B). A bearing 164 is attached to the right end of the spring 168. The bearing 164 comprises an inclined surface 165. By means of the spring 168 the bearing 164 is pressed against a counter bearing 166 such that the inclined surface 165 bears against a roof-like surface 166a of the counter bearing 166. The counter bearing 166 is fixed to an outer carrier element 162 of the first segment 160 (not shown in FIG. 10B). The bearing 164 is rotatable with respect to the counter bearing 166 around its horizontal axis 169. A rotation of the bearing 164 causes the inclined surface 165 to slide on the surface 164a, such that bearing 164 is shifted to the left, while at the same time the spring 168 is compressed.

After a rotation of the bearing 164 of approximately 90° a projection 166c of bearing 166 engages a recess 164a of the bearing 164. This provides a locking functionality in the use-position. If the bearing 164 is rotated further, the projection 166c slides out of the recess 164a, the second roof-like surface 166b starts to contact the inclined surface 165, and the bearing 164 is shifted back to the right by the spring force, while the spring 168 is decompressed.

Figure 10C:
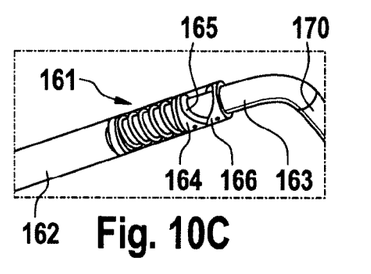
FIGS. 10C-10E: detailed three dimensional views of the support and interlock mechanism of FIG. 10A in several angular positions of the first segment with respect to the second segment.
Figure 10D:
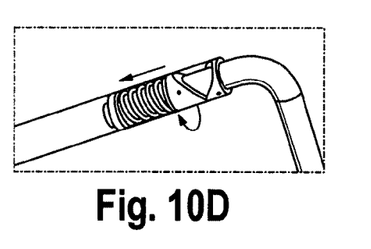
Figure 10E:
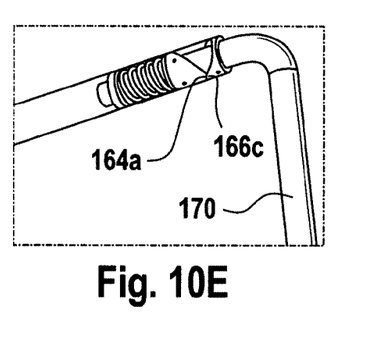
Figure 10F:
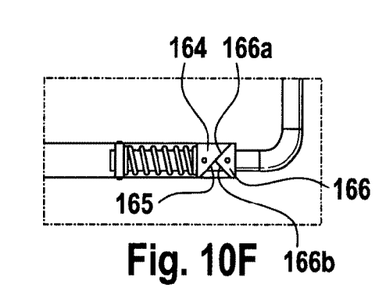
FIGS. 10F-10H: detailed side views of the support and interlock mechanism corresponding to the angular positions shown in FIGS. 10C-10E.
Figure 10G:
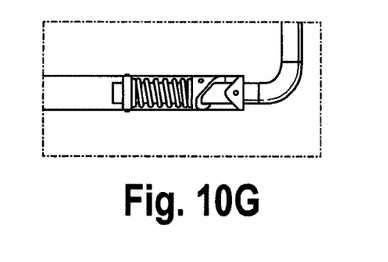
Figure 10H:
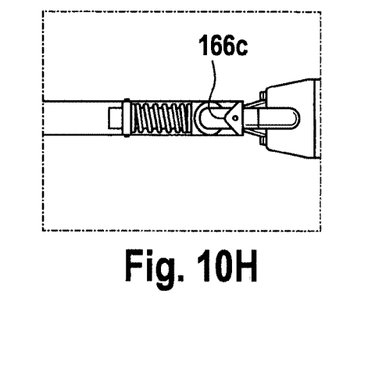
Figure 10I:
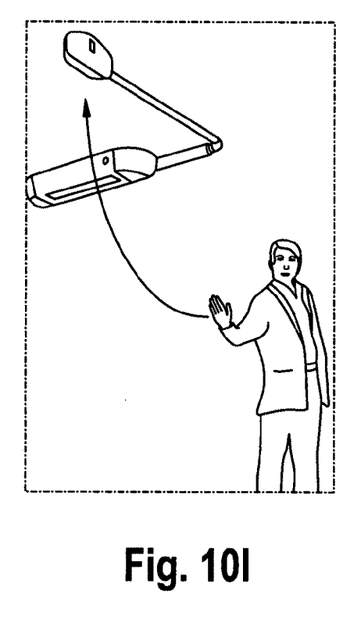
FIG. 10I: a three-dimensional view of the charging arm of FIG. 10A which illustrates the support functionality.

In FIGS. 10C-10H detailed three-dimensional views as well as side views of the support and interlock mechanism 161 are shown in several angular positions of the first segment 162 with respect to the second segment 163, wherein some elements are illustrated transparent for illustration purposes. It can be seen that the first segment 161 comprises an outer carrier element 162 and an inner carrier element 163, wherein the inner carrier element 163 is rotatably received within a circular cavity of the outer carrier element 162. The base 167 is fixed to the inner carrier element 163 and the bearing 166 is fixed to the outer carrier element 162. Furthermore, the second segment 170 is attached to the inner carrier element 163. FIG. 10C also shows that the bearings 166, 164 as well as the spring 168 and the base 167 comprise a circular cavity through which the inner carrier element 163 is inserted.

Thus, a rotation of the second segment 170 around the axis 169 leads to a rotation of the bearing 164 with respect to the bearing 166 (see FIGS. 10C-10E or FIGS. 10F-10H) as described above in connection with FIG. 10B. If the second segment 170 is rotated from the store-position into the use-position by 90°, the projection 166c engages the recess 164a such that the second segment 170 is locked in the use-position (see FIGS. 10E and 10H).

Figure 10J:
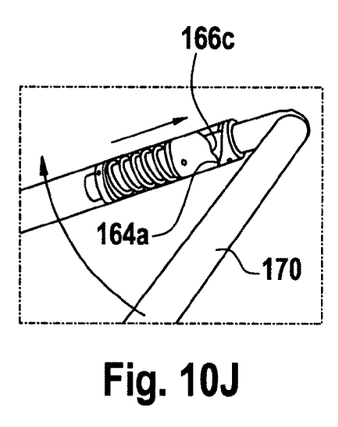
FIGS. 10J, 10K: detailed three dimensional views of the support and interlock mechanism of FIG. 10A in several angular positions.
Figure 10K:
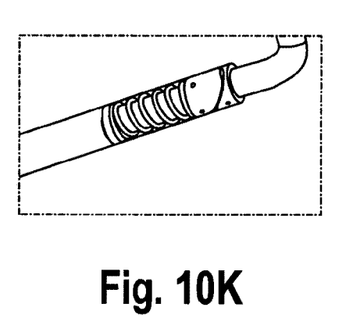
Figure 10L:
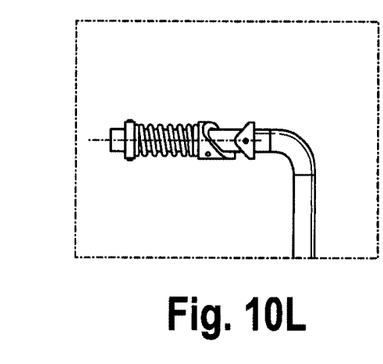
FIGS. 10L-10M detailed side views of the support and interlock mechanism corresponding to the angular positions shown in FIGS. 10J and 10K.
Figure 10M:
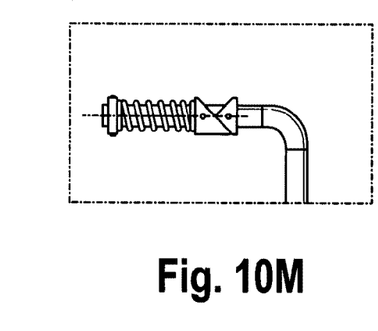

A further rotation of the second segment 170 is illustrated in FIGS. 10I-10M. As shown in FIG. 10J the projection 164a slides out of the recess 166c, if the second segment 170 is rotated to an angular position of more than 90°. At the same time the inclined surface 165 starts to contact the second roof-like surface 166b and the bearing 164 is shifted back to the right by the spring force while the spring 168 is decompressed. Due to the spring force, the movement of the charging arm from the use-position into the store-position is supported.

Figure 10N:
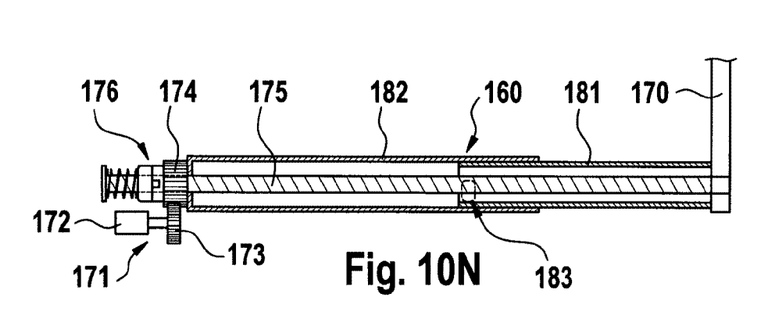
FIGS. 10N, 10P, and 10Q: sectional side views of a further embodiment of the inventive charging station.
Figure 10P:
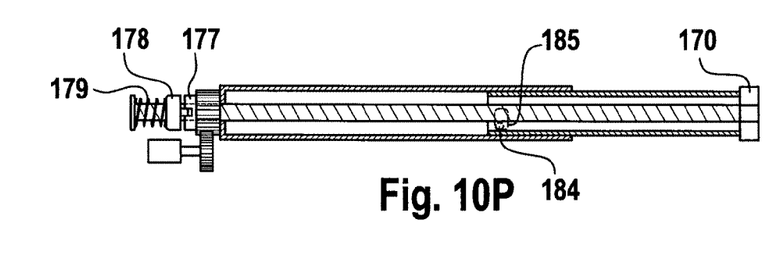
Figure 10Q:
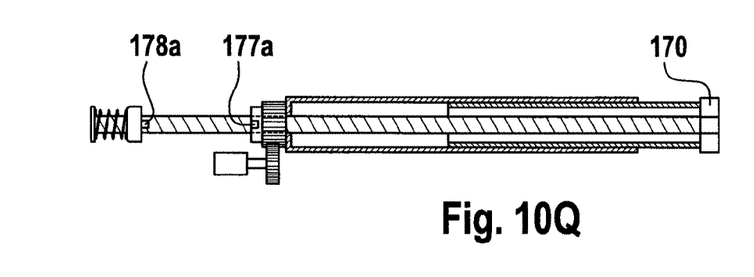
Figure 10R:
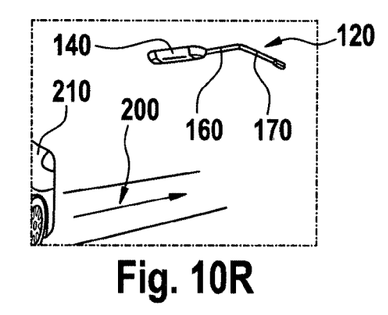
FIGS. 10R-10T: three-dimensional views of the embodiment of FIGS. 10N-10Q, illustrating several positions of the charging arm.
Figure 10S:
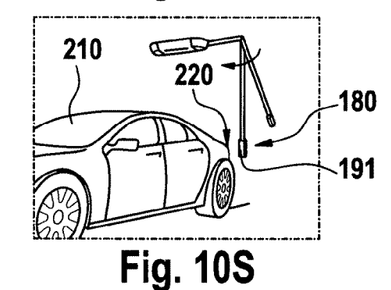
Figure 10T:
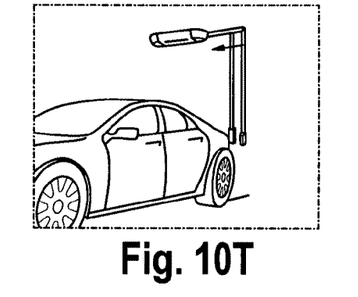

FIGS. 10N-10Q show sectional side views of a further embodiment of an inventive charging arm. FIGS. 10R-10T show corresponding three-dimensional views of the charging station in which the angular position of the charging arm is visible. The charging arm 120 is provided with an automatic drive mechanism 171. The drive mechanism 171 comprises an electric engine 172 which drives a gear wheel 173. The gear wheel 173 is in engagement with a transmission element 174 having an inner thread. The inner thread of transmission element 174 is engaged with an outer thread of a spindle 175. If the transmission element 174 is rotated by the electric engine 172 via the gear wheel 173, the spindle 175 is shifted linearly along its longitudinal axis. Accordingly, the second segment 170 being attached to the spindle 175 is likewise shifted along the axis of the spindle 175 (as shown by a comparison of the position of the second segment 170 in FIGS. 10N-10Q).

Furthermore, the automatic drive mechanism 171 is provided with a detachable connection 176 between the transmission element 174 and the second segment 170. The detachable convection comprises a first clutch element 177 being fixed to the transmission element 174 and a second clutch element 178 being fixed to the spindle 175. The first clutch element 177 has a cavity 177a into which a corresponding nib 178a of the second clutch element 178 can be inserted.

In FIGS. 10N and 10R the store-position of the charging arm is shown. In this position the second clutch element 178 is pressed against the first clutch element 177 such that the nib 178a engages the cavity 177a. A rotation of the first clutch element 177 is transmitted to the second clutch element 178 by means of the press-fit and form-fit between nib 178a and cavity 177a. Accordingly, a rotation of the transmission element 174 is transmitted to the second segment 170 via the first and second clutch elements 177, 178 and the spindle 175. Accordingly, the second segment 170 rotates around the spindle 175 from the store-position (shown in FIGS. 10N and 10R) into the use-position (shown in FIGS. 10P and 10S).

As shown in FIGS. 10N and 10P a rotation restrictor 183 is provided at the first segment 160 in order to stop the rotation of the second segment 170, if the use-position is reached. For this purpose the first segment 160 comprises an outer tube 182 being fixed to the housing (not shown in FIG. 10N) and an inner tube 181 being fixed to the second segment 170. The inner tube 191 is rotatably mounted within the outer tube 182 by means of low friction bearings. The rotation restrictor 183 comprises a bolt 184 being attached to the inner tube 181 and a notch 185 being circumferentially arranged in the outer tube 182 over an angle of 90°. During a rotation of the second segment 170 from the store-position into the use-position the bolt 184 moves within the notch 185. If the use-position is reached the bolt 184 abuts the boundary of the notch 184 such that the rotation of the inner tube 181 is stopped. Thus, a further rotation of the spindle 175 (being fixed to the second segment 170 and the inner tube 181) is prevented. Accordingly, a further rotation of the transmission element 174 induces the second clutch element 178 to be detached from the first clutch element 177, as shown in FIG. 10P. A further rotation of the transmission element, thus, induces a linear movement of the spindle 175 as shown by FIGS. 10Q and 10T.

The automatic movement of the charging arm shown in FIGS. 10N-10T can be utilized to automatically connect the charging interface 180 of the charging station with the charging socket 220 of the electric vehicle 210. For this purpose the charging interface 180 comprises a sensor 191 being adapted to detect positional data of the charging socket 220 of the electric vehicle 210, as shown in FIG. 10S. If the electric vehicle 210 is parked on the parking space 200, the sensor 191 detects the position of the charging socket 220. The positional data are converted by a processing unit (not shown in FIG. 10S) of the charging station into movement data. The movement data are transmitted to the automatic drive mechanism 171. Afterwards the automatic drive mechanism 171 moves the charging arm according to the movement data such that the charging interface 180 is automatically inserted into the charging socket 220. This process is illustrated in FIGS. 10S and 10T.

In an alternative embodiment, the electric vehicle is a self-driving electric vehicle which is adapted to automatically drive to an exactly defined position on the parking space 200. In this position the charging interface can be inserted into the charging socket by a predefined movement of the charging arm. As the position of the electric vehicle—and likewise the position of the charging socket—is exactly defined with respect to the charging station, there is no necessity of using a sensor for detecting the exact location of the charging socket.

Figure 11:
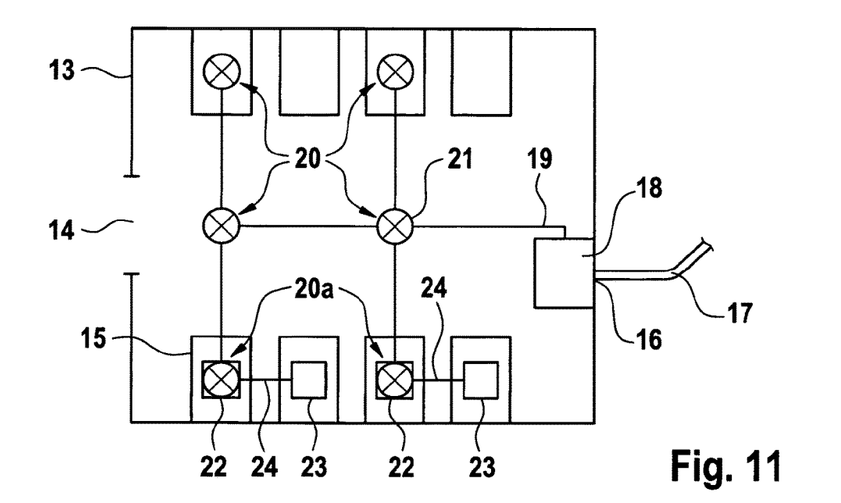
FIG. 11: a schematic overview of a first embodiment of an inventive parking structure.

FIG. 11 shows a schematic overview of a first embodiment of an inventive parking structure 13. The parking structure 13 comprises an access 14 for vehicles and eight parking spaces 15 arranged within the parking structure 13. Vehicles may enter the parking structure through the access 14 and park at one of the parking spaces 15.

Four of the parking spaces 15 located at the lower side of FIG. 11 are provided with charging stations 23 or with charging stations 22 comprising a lamp. The charging stations 22 and 23 are mounted to the ceiling of the parking structure above the parking spaces 15. An electric vehicle may park on one of the parking spaces beneath one of the charging stations 22 or 23 so that the battery of the electric vehicle can be recharged. For this purpose, the charging stations 22 and 23 comprise a charging interface (not shown in FIG. 11) for connection with a corresponding charging socket of the electric vehicle (not shown in FIG. 11).

Six lamp positions 20 and 20a are provided in the parking structure 13. At four lamp positions 20 fluorescent tubes 21 are mounted to the ceiling of the parking structure. At two other lamp positions 20a charging stations 22 comprising LED lamps are located. The LED lamps of the charging stations 22 and the fluorescent tubes 21 provide a sufficient illumination of the parking structure. In particular, the LED lamps of the charging station 22 provide a luminous flux of 1500 lm.

At a connection point 16, a cable 17 from an energy provider arrives at the parking structure 13 in order to provide electric power. The cable 17 leads into a wiring cabinet 18 from which the electric power is distributed. A first lamp supply cable 19 leads from the wiring cabinet 18 to a first lamp position 20 and further lamp supply cables lead from the first lamp position 20 to other lamp positions 20, 20a. The lamp supply cables are used to provide electric energy to the fluorescent tubes 21 and to the charging stations 22 comprising LED lamps. Further connection cables 24 are used to supply electric energy from the lamp positions 20a to the charging stations 23.

Figure 12:
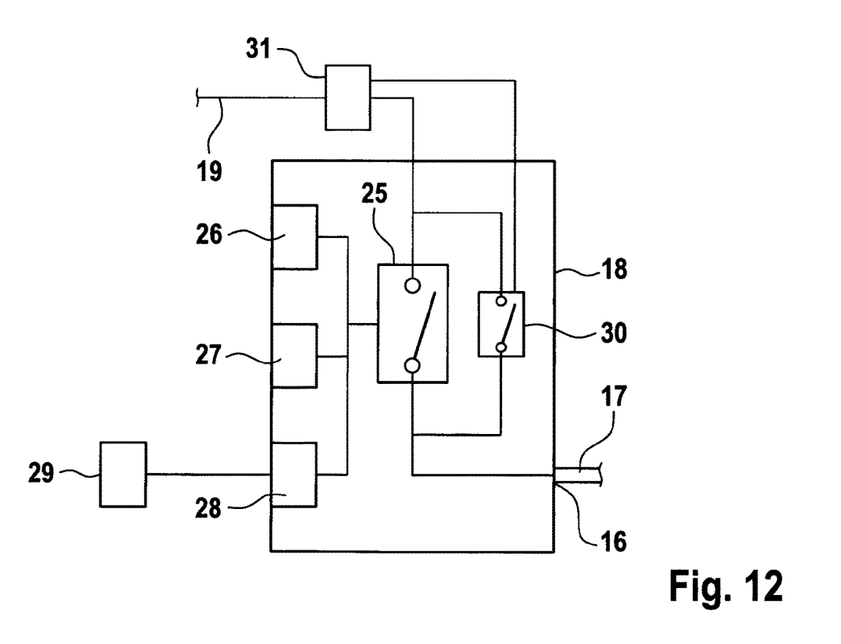
FIG. 12: a schematic view of a wiring cabinet of the first embodiment shown in FIG. 11.

FIG. 12 shows a more detailed schematic view of the wiring cabinet 18 of the first embodiment. The wiring cabinet 18 comprises a switch 25 which is adapted to switch on and off the power supply from the connection point 16 to the lamp supply cable 19. The switch can be controlled by a manual controller 26, by a time controller 27, and by a motion controller 28. By using the manual controller 26, an operator may manually switch on or off the power supply to the fluorescent tubes 21 and to the charging stations 22, 23. Furthermore, the time controller 27 is configured to switch on the power supply at certain times (for example during daytime) and to switch off the power supply at other times (for example during night time). The motion controller 28 is connected to a motion sensor 29 which is placed in the parking structure outside of the wiring cabinet 18. The motion sensor 29 sends motion signals to the motion controller 28. The motion controller 28 is configured to switch on the power supply, if a motion of a vehicle or a person is detected by the motion sensor 29. If no motion is detected for a certain time span the motion controller 28 switches off the power supply.

A bypass 30 is installed parallel to the switch 25. Furthermore, a current sensor 31 is arranged at the lamp supply cable 19. The current sensor 31 detects the current flow in the lamp supply cable 19. If a battery of a vehicle is attached to a charging station 22 or 23, the current sensor 31 detects an increased current flow through the lamp supply cable 19. In this case the current sensor 31 sends a first signal to the bypass 30. Upon receipt of the first signal from the current sensor 31, the bypass 30 bypasses the switch 25. In this case power is supplied from the connection point 16 to the lamp supply cable 19 via the bypass 30. Accordingly, the battery attached to one of the charging stations 22, 23 is charged irrespective of the switching state (on-state or off-state) of the switch 25.

If the battery is charged to a desired charging level, the current sensor 31 detects a decrease in the current flow in the lamp supply cable 19. In this case the current sensor 31 sends a second signal to the bypass 30. Upon receipt of the second signal the bypass 30 discontinues to bypass the switch 25.

Due to the provision of the inventive bypass 30 and current sensor 31, it is not required to equip each charging station with a sensor for the connection status or with a switch for switching on or off the power supply. In the exemplary embodiment it is rather sufficient to provide a single bypass 30 and a single current sensor 31 at a central position in the parking structure. Accordingly, the installation costs are reduced considerably.

Figure 13:
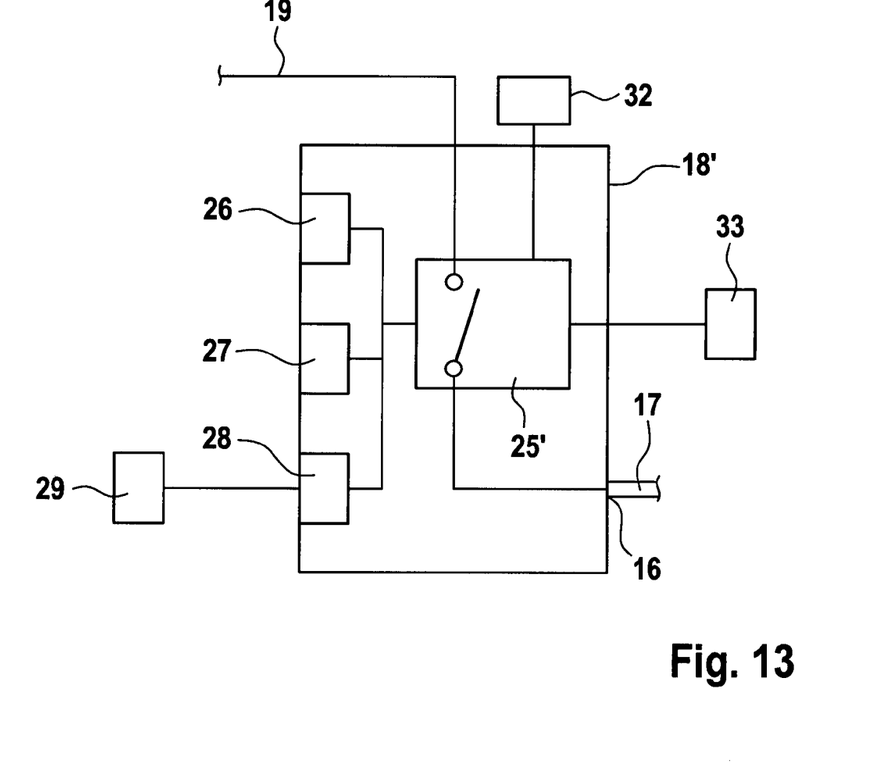
FIG. 13: a schematic view of a wiring cabinet of a second embodiment of an inventive parking structure.

FIG. 13 shows an alternative embodiment of a wiring cabinet in accordance with the present invention in a schematic overview. In comparison with the wiring cabinet of FIG. 12, the switch 25 has been replaced by the switch 25'. Furthermore, in FIG. 13 the switch 25' is attached to a convection sensor 32 and there exists no bypass for the switch 25'. The connection sensor 32 is arranged outside of the wiring cabinet 18' at a charging station (not shown in FIG. 13). The connection sensor 32 detects whether or not a connection between the charging station and a battery of an electric vehicle is established and sends an according signal to the switch 25'. In particular, the connection sensor 32 sends a first signal in case a connection between a battery of an electric vehicle and a charging station is detected. Upon receipt of the first signal, the switch 25' is set to a charging mode. In the charging mode the switch 25' is set to the on-state, if it has been in the off-state before, or the switch remains in the on-state, if it has been in the on-state before. Furthermore, in the charging mode the manual, time-controlled, or motion-controlled switching of the switch is deactivated. Therefore, a battery can be charged irrespective of the previous switching state of the switch 25' and irrespective of controlling actions of the controllers 26, 27, 28 during the charging process. Upon receipt of the second signal from the connection sensor 32, the switch is set into a non-charging mode, in which the power supply to the lamp position is controlled by the controllers 26, 27, 28.

In FIG. 13 a user interface 33 is shown which is located at a central position in the parking structure, for instance next to the wiring cabinet 18'. The user interface is connected to the switch 25'. After connecting a battery of an electric vehicle to a charging station, the user may enter a desired charging time or a desired amount of charging-energy to be fed to the battery. Subsequently, the switch 25' is set to the charging mode as explained above, so that the battery can be charged as requested by the user.

Figure 14:
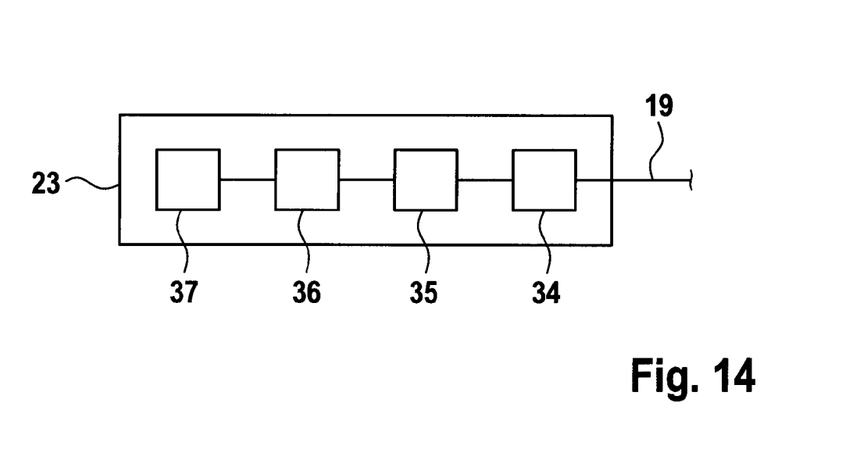
FIG. 14: a schematic illustration of the configuration of protective devices arranged in an inventive charging station.

Finally, FIG. 14 shows a schematic illustration of the configuration of protective devices arranged in an inventive charging station. Electric power is supplied to a charging station 23 by a lamp supply cable 19. The charging station comprises a charging interface 37 for connection with a corresponding charging socket of an electric vehicle (not shown in FIG. 14). In order to protect the user in case of malfunctions, a circuit breaker 34 and a residual current protective device 36 are arranged in the circuit before the charging interface 37. Furthermore, a meter 35 is arranged between the circuit breaker 34 and the residual current protective device 36.

The invention claimed is:

1. A ceiling mounted charging station for charging the battery of an electric vehicle (210) parking on a parking space (200),
   wherein the charging station comprises a charging arm (120) for connection with the electric vehicle (210),
   wherein the first end of the charging arm (120) is mounted to a housing (140) of the charging station,
   wherein a charging interface (180) for connection with a corresponding charging socket (220) of the electric vehicle (210) is located at a second end of the charging arm (120) opposite to the first end,
   wherein the charging arm (120) is rotatable with respect to the housing (140) between a stored-position and a use-position,
   wherein the distance of the second end of the charging arm (120) to the ground (250) of the parking space (200) is smaller in the use-position as in the stored-position, and
   wherein the charging arm comprises a first segment (160) at which the charging arm (120) is mounted to the housing (140) and a second segment (170) at which the charging interface (180) is located, the first segment (160) and the second segment (170) enclosing an angle between 45° and 135° between each other, wherein the charging arm (120) is rotatable between the stored-position and the use-position around an axis (320) being essentially parallel to a horizontal axis and wherein the first segment (160) is arranged essentially parallel to the axis (320).

2. The charging station of claim 1, wherein the first segment (160) and the second segment (170) enclose an angle between each other which is essentially rectangular.

3. The charging station according to claim 1, wherein the charging arm (120) is rotatable with respect to the housing (140) around a second axis (330).

4. The charging station according to claim 3, wherein the second axis (330) encloses an angle between 70° and 110° with the first axis (320).

5. The charging station according to claim 1, wherein the charging station furthermore comprises at least one of the following:
   a) a pulling means (350) which is attached to the charging arm (120);
   b) a hooking element (240) for a connection cable;
   c) a lamp for illumination of the parking space (200).

6. The charging station of claim 5, wherein the hooking element (240) is arranged at the charging interface (180).

7. The charging station of claim 5, wherein the lamp emits a luminous flux of more than 200 lumen.

8. The charging station of claim 1, wherein the first segment (160) of the charging arm (120) comprises a support and/or an interlock mechanism (161) being adapted to lock the charging arm (120) in the use-position and/or to support the movement of the charging arm from the use-position into the store-position.

9. The charging station of claim 8, wherein the first segment (160) comprises an outer carrier element (162) being attached to the housing (140) and an inner carrier element (163) being attached to the second segment (170), wherein a rotation of the charging arm between the use-position and the store-position is achieved by a rotation of the inner carrier element (163) with respect to the outer carrier element (162), and wherein the support and/or interlock mechanism (161) is adapted to support a rotation of the inner carrier element (163) with respect to the outer carrier element (162) and/or to lock the inner carrier element (163) with respect to the outer carrier element (162) in a position corresponding to the use-position of the charging arm.

10. The charging station of claim 9, wherein the support and/or interlock mechanism (161) comprises a spring biased bearing (164) being attached to the inner carrier element (163) and having an inclined surface (165), and a counter bearing (166) being attached to the outer carrier element (162), wherein the counter bearing (166) comprises roof-like surfaces (166a, 166b) being adapted to cooperate with the inclined surface (165) of the spring biased bearing (164) during a rotation of the inner carrier element (163) with respect to the outer carrier element (162).

11. The charging station of claim 1, wherein the charging station comprises an automatic drive mechanism (171) being adapted to move the charging arm (120).

12. The charging station of claim 11, wherein the automatic drive mechanism (171) is adapted to rotate the second segment (170) around the axis (320) of the first segment (160) and to move the second segment (170) along the axis (320) of the first segment (160).

13. The charging station of claim 11, wherein the automatic drive mechanism (171) comprises an electric engine (172) being adapted to drive a transmission element (174) having an inner thread, wherein the inner thread is in engagement with an outer thread of a spindle (175), wherein the spindle (175) is arranged essentially along the axis (320) of the first segment (160), and wherein the spindle (175) is attached to the second segment (170).

14. The charging station of claim 11, wherein the automatic drive mechanism (171) comprises a detachable connection (176) between the transmission element (174) and the second segment (170), wherein the second segment (170) is rotated around the axis of the first segment (160) when attached to the transmission element (174).

15. The charging station of claim 11, wherein the charging station comprises a sensor (191) for detecting positional data of the charging socket (220) of an electric vehicle (210) being parked on the parking space (200), a processing unit being adapted to convert the positional data of the charging socket (220) into corresponding movement data of the charging arm (120), wherein the automatic drive mechanism (171) is adapted to receive the movement data from the processing unit and to move the charging arm (120) according to the movement data.

16. A system comprising a charging station of claim 11 and a self-driving electric vehicle (210), wherein the electric vehicle (210) is adapted to automatically drive to a position on the parking space (200), wherein the position is exactly defined with respect to the charging station.

17. The system of claim 16, wherein the charging station comprises a sending unit for sending positional data corresponding to the exactly defined position, wherein the self-driving electric vehicle (210) comprises a receiving unit for receiving the positional data, wherein the electric vehicle (210) is adapted to convert the positional data to a corresponding movement of the electric vehicle (210), wherein the movement is adapted to move the electric vehicle to the exactly defined position.

* * * * *